US011577966B2

United States Patent
Pukkella et al.

(10) Patent No.: US 11,577,966 B2
(45) Date of Patent: Feb. 14, 2023

(54) APPARATUS AND METHOD FOR CONTINUOUS SOLVOTHERMAL SYNTHESIS OF NANOPARTICLES

(71) Applicant: Tata Consultancy Services Limited, Mumbai (IN)

(72) Inventors: Arjun Kumar Pukkella, Pune (IN); Sivakumar Subramanian, Pune (IN); Nagaravi Kumarvarma Nadimpalli, Pune (IN); Raviraju Vysyaraju, Pune (IN); Venkataramana Runkana, Pune (IN)

(73) Assignee: TATA CONSULTANCY SERVICES LIMITEG, Mumbai (IN)

(*) Notice: Subject to any disclaimer, the term of this patent is extended or adjusted under 35 U.S.C. 154(b) by 211 days.

(21) Appl. No.: 17/174,233

(22) Filed: Feb. 11, 2021

(65) Prior Publication Data
US 2021/0292181 A1   Sep. 23, 2021

(51) Int. Cl.
*C01F 17/235* (2020.01)
*B22F 9/24* (2006.01)
(Continued)

(52) U.S. Cl.
CPC ........... *C01F 17/235* (2020.01); *B01J 19/006* (2013.01); *B01J 19/0013* (2013.01);
(Continued)

(58) Field of Classification Search
CPC .... C01F 17/235; B01J 19/0013; B01J 19/006; B01J 19/0066; B01J 2219/00033;
(Continued)

(56) References Cited

U.S. PATENT DOCUMENTS

| 7,935,169 B2 | 5/2011 | Lee et al. | |
| 2014/0001663 A1* | 1/2014 | Kuraki | B01J 19/1875 264/8 |
| 2017/0348667 A1* | 12/2017 | Farrar | B01F 33/30 |

FOREIGN PATENT DOCUMENTS

JP         6017204 B2    10/2016

OTHER PUBLICATIONS

Granados-Miralles, Cecilia et al., "Unraveling Structural and Magnetic Information During Growth of Nanocrystalline SrFe 12 O 19", Journal of Materials Chemistry C, Nov. 2016, Research Gate, https://www.researchgate.net/publication/309687223_Unraveling_Structural_and_Magnetic_Information_During_Growth_of_Nanocrystalline_SrFe_12_O_19/link/5af2aabd458515c2837979eb/download.

* cited by examiner

*Primary Examiner* — Timothy C Vanoy
(74) *Attorney, Agent, or Firm* — Finnegan, Henderson, Farabow, Garrett & Dunner LLP

(57) ABSTRACT

An apparatus and a method for continuous solvothermal synthesis of nanoparticles, are provided. The apparatus includes an inlet section, a reactor section, a flexible quenching unit, and an outlet section. The inlet section separately receives reactants including the solvent and a precursor solution that are allowed to flow into the reactor section. The reactor section includes multiple spiral turns such that each of the spiral turns includes a helical channel followed by a counter-helical channel for enabling mixing of the reactants to cause solvothermal reactions between them. The counter-helical channel changes the direction of flow of reactants upon flow of said reactants from the helical channel to the counter-helical channel. The flexible quenching section enclosing a portion of the reactor section quenches a slurry formed as a result of the solvothermal reactions, wherein the (Continued)

slurry includes the nanoparticles of targeted characteristics. The outlet section facilitates withdrawal of the slurry.

9 Claims, 16 Drawing Sheets

(51) Int. Cl.
  *B01J 19/00* (2006.01)
  *B82Y 40/00* (2011.01)
(52) U.S. Cl.
  CPC ............. *B01J 19/0066* (2013.01); *B22F 9/24* (2013.01); *B01J 2219/00033* (2013.01); *B01J 2219/00772* (2013.01); *B01J 2219/1944* (2013.01); *B22F 2302/25* (2013.01); *B22F 2998/00* (2013.01); *B82Y 40/00* (2013.01); *C01P 2004/64* (2013.01)
(58) Field of Classification Search
  CPC ..... B01J 2219/00772; B01J 2219/1944; B22F 9/24; B22F 2302/25; B22F 2998/00; B82Y 40/00; C01P 2004/64
  See application file for complete search history.

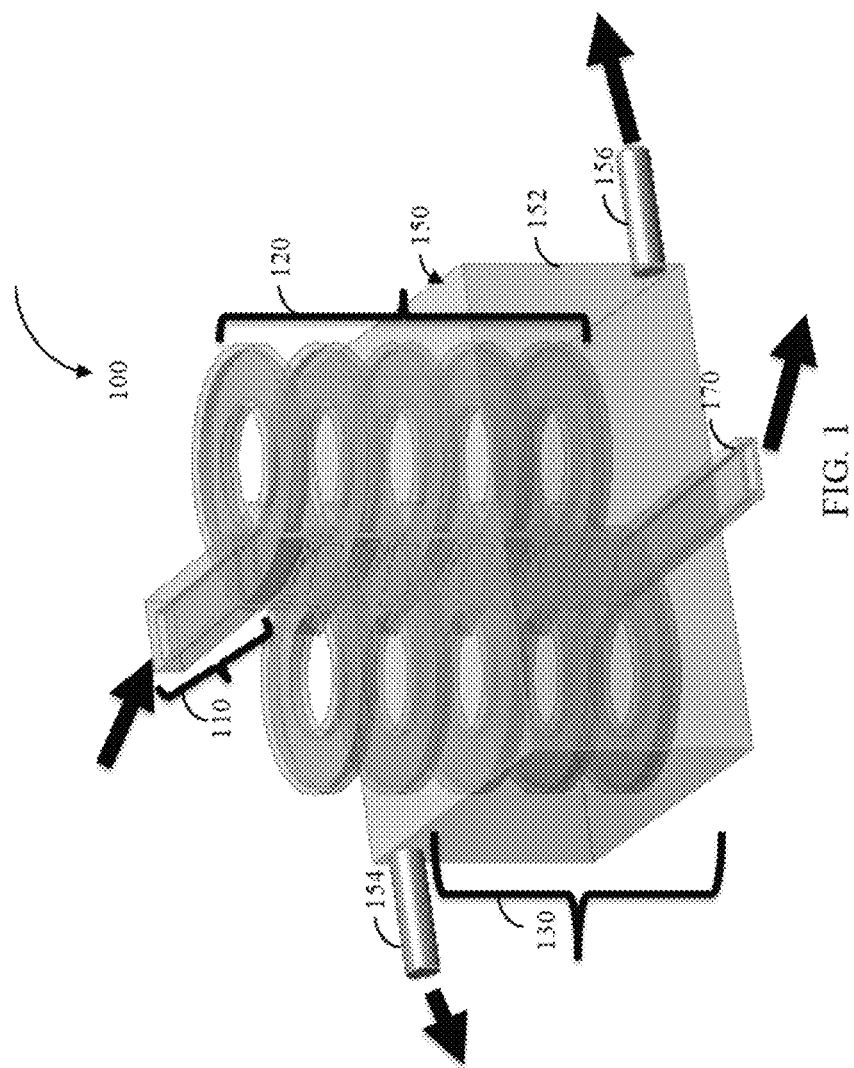

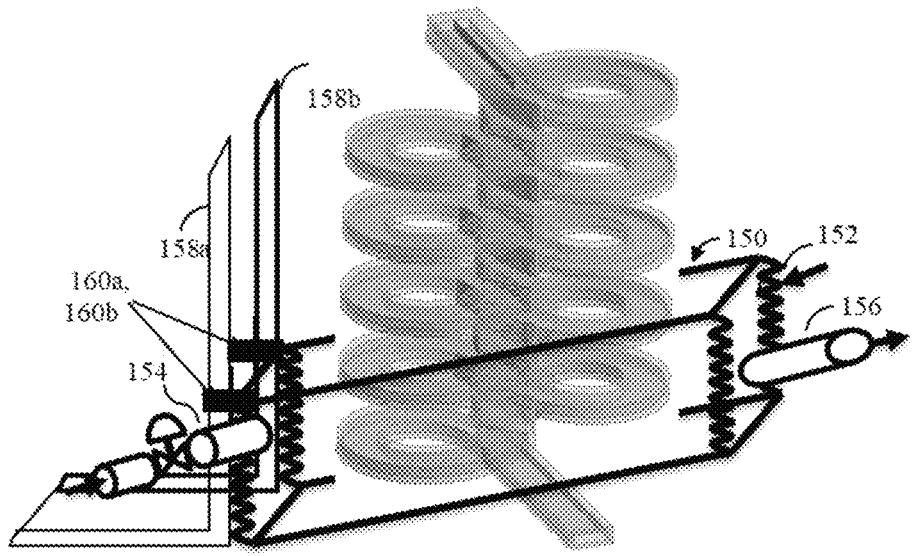

FIG. 6B

| INTRODUCE, IN AN APPARATUS FOR CONTINUOUS SOLVOTHERMAL SYNTHESIS OF NANOPARTICLES, A SOLVENT AND A PRECURSOR FLUID, WHEREIN THE APPARATUS INCLUDES AN INLET SECTION, A REACTOR SECTION, A FLEXIBLE QUENCHING SECTION AND AN OUTLET SECTION, AND WHEREIN ON INTRODUCING, THE SOLVENT AND THE PRECURSOR FLUID UNDERGOES SOLVOTHERMAL REACTION TO FORM A SLURRY COMPRISING THE NANOPARTICLES | 702 |
| QUENCH THE SLURRY, IN THE FLEXIBLE QUENCHING UNIT, TO OBTAIN THE NANOPARTICLES OF TARGET PROPERTIES | 704 |
| COLLECT, AT THE OUTLET SECTION, THE SLURRY QUENCHED IN THE QUENCHING UNIT | 706 |

FIG. 7    700

APPARATUS AND METHOD FOR CONTINUOUS SOLVOTHERMAL SYNTHESIS OF NANOPARTICLES

PRIORITY CLAIM

This U.S. patent application claims priority under 35 U.S.C. § 119 to: India Application No. 202021006347, filed on Feb. 13, 2020. The entire contents of the aforementioned application are incorporated herein by reference.

TECHNICAL FIELD

The embodiments herein generally relate to the field of nanoparticle synthesis, and, more particularly, to method and an apparatus for continuous solvothermal synthesis of nanoparticles.

BACKGROUND

Nanoparticles are microscopic particles with at least one dimension less than 100 nm. Due to their small size, nanoparticles exhibit unique properties, and hence are utilized in various applications including, but not limited to catalysts, chemical mechanical planarization (CMP) agents, pigments, drug delivery carriers, coatings, condensers, magnetic tapes and so on. Due to a wide variety of applications thereof, there is a growing interest for a commercial production or synthesis of nanoparticles as the same is not yet completely successful.

Nanoparticle synthesis through solvothermal method includes mixing of reactants and then subsequent solvothermal-chemical reactions, particle formation and growth. The mixing of reactants in the solvothermal reactor plays a crucial role in controlling the solvothermal reactions and subsequent particle formation and growth steps. Various conventional apparatus are available for synthesis of nanoparticle production. The inventors here have recognized several technical problems and limitations with such conventional systems, as explained below.

The conventional apparatus for nanoparticle synthesis is typically batch reactor employing prolonged heating and aging time to obtain the required particle properties. Such conventional apparatus are limited to operate on moderate temperatures. Since the batch reactors require longer process times with smaller precursor loadings, the throughput and productivity of the batch reactors are low as compared to continuous reactors. Continuous reactors typically utilize high temperature solvent (which is produced a prior) and metal salt precursor for the continuous production of nanoparticles. Although, several continuous reactor configurations have been proposed in the art, those are limited with poor mixing characteristics and smaller throughputs. Moreover, conventional continuous reactors are inefficient for the continuous production of nanoparticles as the mixing of reactants are not rapid thereby resulting in the longer time scales for chemical reactions, particle formation and growth, and further leading to poor control of particle characteristics (such as particle size, particle size distribution, morphology, and crystallinity, and so on.).

SUMMARY

Embodiments of the present disclosure present technological improvements as solutions to one or more of the above-mentioned technical problems recognized by the inventors in conventional systems. For example, in one embodiment, an apparatus for continuous solvothermal synthesis of nanoparticles is provided. The apparatus includes an inlet section, a reactor section, a flexible quenching unit, and an outlet section. The inlet section comprises a plurality of inlet portions for separately receiving at least a metallic precursor solution and a solvent. The reactor section extends from the inlet section and enables continuous mixing resulting in solvothermal reactions between the metallic precursor solution and the solvent, and further nanoparticles formation and nanoparticles growth. The reactor section comprises a spiral section having a plurality of spiral turns, each spiral turn of the plurality of spiral turns having a helical channel followed by a counter-helical channel, wherein the metallic precursor solution and the supercritical fluid interchanges the flow direction for enabling mixing between the metallic precursor solution and the solvent, and wherein the solvothermal reactions between the metallic precursor solution and the solvent yields a slurry comprising nanoparticles. The flexible quenching unit enclosing a set of spiral turns from amongst the plurality of spiral turns, the set of spiral turns configured in proximity to an exit portion of the reactor section, the flexible quenching unit is capable of holding a quenching fluid for rapidly reducing temperature of the reactor section to a set temperature, further wherein the flexible quenching unit is capable of adjusting a number of the set of spiral turns based on targeted particle characteristics of the nanoparticles. The outlet section configured at an exit portion of the reactor section for collecting the slurry of nanoparticles.

In another aspect, a method for continuous solvothermal synthesis of nanoparticles is provided. The method includes introducing, in an apparatus for continuous solvothermal synthesis of nanoparticles, a metallic precursor solution and a solvent. The apparatus includes an inlet section, a reactor section, a flexible quenching unit, and an outlet section. The inlet section comprises a plurality of inlet portions for separately receiving at least the metallic precursor solution and a solvent. The reactor section extends from the inlet section and enables continuous mixing resulting in solvothermal reactions between the metallic precursor solution and the solvent, and further nanoparticles formation and nanoparticles growth. The reactor section comprises a spiral section having a plurality of spiral turns, each spiral turn of the plurality of spiral turns having a helical channel followed by a counter-helical channel, wherein the metallic precursor solution and the supercritical fluid interchanges the flow direction for enabling mixing between the metallic precursor solution and the solvent, and wherein the solvothermal reactions between the metallic precursor solution and the solvent yields a slurry comprising nanoparticles. The flexible quenching unit enclosing a set of spiral turns from amongst the plurality of spiral turns, the set of spiral turns configured in proximity to an exit portion of the reactor section, the flexible quenching unit is capable of holding a quenching fluid for rapidly reducing temperature of the reactor section to a set temperature, further wherein the flexible quenching unit is capable of adjusting a number of the set of spiral turns based on targeted particle characteristics of the nanoparticles. The outlet section configured at an exit portion of the reactor section for collecting the slurry of nanoparticles. Further the method includes quenching the slurry, in the flexible quenching unit, to obtain the nanoparticles of targeted characteristics. Also, the method includes collecting, at the outlet section, the slurry quenched in the quenching unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrate an isometric view of an apparatus for continuous solvothermal synthesis of nanoparticles, in accordance with an example embodiment.

FIGS. 6A-6B illustrate example flexible quenching unit of the apparatus of FIG. 1, in accordance with an example embodiment.

FIG. 7 illustrates a flow-diagram of a method for continuous solvothermal synthesis of nanoparticles, in accordance with an example embodiment.

DETAILED DESCRIPTION

Figure 2A:
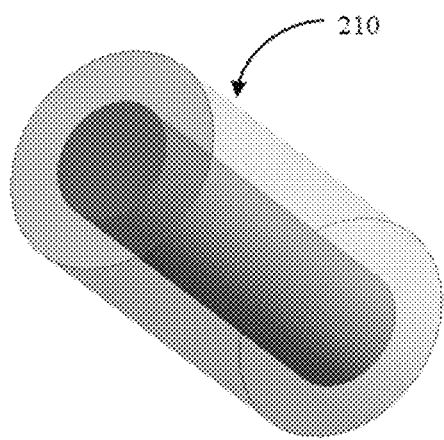
FIGS. 2A-2D illustrates example inlet sections of the apparatus of FIG. 1, in accordance with various embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Traditionally, reactors that are utilized a batch reactor for synthesis of nanoparticles in industrial applications are configured to carry the reactants such as a precursor fluid and a solvent. The reactants are allowed to mix and carry out a chemical reaction to thereby produce nanoparticles. The chemical reaction is carried out by varying the temperature and pressure of the reactants in the reactor.

For nanoparticle production, the mixing of the reactants must be instantaneous so that the resulting product molecules undergo the similar chemical reaction, particle formation and growth steps to yield the uniform product nanoparticle slurry characteristics. Due to a structural and flow configuration thereof, the conventional reactors have a limited capacity to provide a better contact between the reactants (metal salt solution and solvent) and therefore the mixing between reactants is not adequate and spreads over a longer time and length scales resulting in the incomplete or prolonged reaction and therefore incomplete particle formation and growth, which adversely affects the yield of nanoparticle production and quality of the final product nanoparticle slurry.

Typical reactors employ mediums, such as an oil bath, for heating the reactants. These heating mediums are typically configured outside the reactor carrying the reactants, and hence results in uneven mixing of the reactants and inflexible in controlling the reactor temperature, thereby resulting in slow chemical reaction, and consequently production of nanoparticles having a wider particle size distribution with bigger particle sizes and poor control of particle shape and crystallinity.

In typical reactors, the reaction and particle growth can be quenched by, for example, submerging the reactor into a fluid such as water bath. However, the quenching enabled by the conventional reactors requires the entire reactor to be submerged into the quenching fluid, thereby arresting the reaction, which may not always be desired. For instance, in some cases, it may be desired to control the reaction instead of completely quenching it.

The available reactors employ a batch-type of operation with very limited throughput and production rates. As is known, in a batch operation, the reactants are taken into a vessel and processed to produce the products. The products are further emptied out from the reactor to take a new batch. This process of feeding-in the reactants and emptying-out the products takes is time-intensive. Also, the new batch of reactants again have to be heated up to the required temperature to carry out the desired reaction. Because of the aforementioned process steps, the entire batch operation consumes a significant amount of time.

Various embodiments disclosed herein provides an apparatus and a method for continuous synthesis of nanoparticles that overcomes limitations of conventional methods and apparatus. For example, in an embodiment, the disclosed apparatus includes spiral turns configured in the shape of 'infinity' that allows for proper mixing of the reactants. Further, the disclosed apparatus avoids external heating of the reactor by introducing supercritical water along with the precursor solution while the reactor is covered with heat insulation. The heat supplied by the supercritical water facilitates in internal heating of the precursor solution. The advantage of internal heating of the precursor solution is rapid production of nanoparticles as there are no heating barriers while having the precise control on supercritical water temperature and pressure. Additionally, in an embodiment, the apparatus includes a quenching unit that can be flexibly configured to enclose at least a portion of the spiral turns, instead of submerging the entire reactor (as is done conventionally). Hence, the disclosed quenching unit is capable of flexibly bringing down the process conditions/ temperature from 400° C. to 50° C. to produce the nanoparticle with targeted characteristics, thereby allowing for a better control of particle characteristics while maintaining the high throughput and production rates. For example, the quenching unit includes control valves that can be operated to control/vary flowrate of an incoming/outgoing quenching fluid in the quenching unit, so as to achieve a desired temperature inside the quenching unit. With the help of control valves, the disclosed apparatus can achieve desired temperature inside the quenching section. These control valves can vary the incoming/outgoing quenching fluid flowrate. If the incoming flow rate is large the temperature inside the quenching unit is lower and vice-versa. These control valves can be operated with the help of process air (Pneumatic Control Valve), or magnetic control valve, and so on)

While aspects of described apparatus and method for mixing and separation can be implemented in any number of different systems, utility environments, and/or configurations, the embodiments are described in the context of the following exemplary apparatuses.

FIG. 1 illustrates an apparatus 100 for solvothermal synthesis of nanoparticles in accordance with an example embodiment. The apparatus 100 includes an inlet section 110, a reactor section 120, a quenching unit 150, and an outlet section 180. The apparatus 100 facilitates continuous solvothermal synthesis of the nanoparticles by allowing streams of precursor solution (for example, a metallic salt solution) and solvent to contact each other. In an embodiment, the solvent may be a supercritical fluid (meaning at a temperature above its critical point). Examples of the fluid that may be utilized as solvent at their critical temperature may include, but are not limited to, water, CO2, Ethane, Propane, Methanol, Ethanol, and so on.

Said streams mix upon gradually going down the reactor section 120, which results in the solvothermal reactions which may include but not limited to hydrolysis, condensation, poly-condensation, mixed condensation, precipitation and reduction and oxidation to form metal oxide molecules. These molecules forms into nanoparticles by undergoing nucleation, diffusional growth, coagulation, and Ostwald ripening. The details of the components of the apparatus 100, namely inlet section 110, a reactor section 120, a quenching unit 150, and an outlet section 170 for solvothermal synthesis of nanoparticles are further described below.

Since the reactants have different physical and transport properties, in particular, density and viscosity, conventionally there is a challenge in proper mixing of the reactants. The disclosed inlet section 110 is configured to separately receive and introduce the metallic precursor solution and the solvent into the reactor 120. In an embodiment, the proposed inlet section 110 may include a first inlet portion and a second inlet portion for separately introducing the metallic precursor solution and the solvent into the reactor 120. As previously discussed, two different streams of reactants including the supercritical water (T=400 C, p=220 bar) and the precursor solution (T=28 C, p=220 bar) are introduced separately into the reactor 120 from the first inlet portion and the second inlet portion.

In an embodiment, the proposed inlet section 110 may assume any of the configurations, including but not limited to, concentric circular inlets, eccentric circular inlets and rectangular concentric annular inlet section and rectangular side by side inlet section. The aforementioned configurations of the inlet section are illustrated and described further with reference to FIGS. 2A-2D.

Figure 2B:
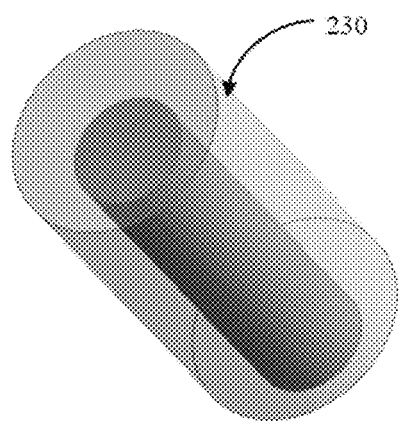
Figure 2C:
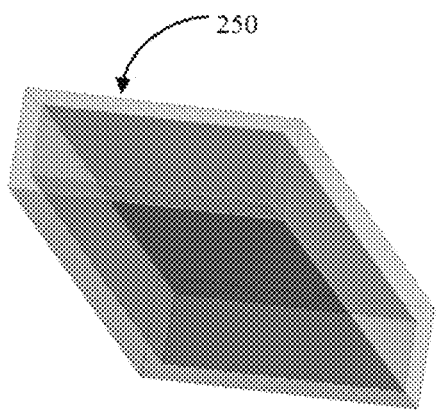
Figure 2D:
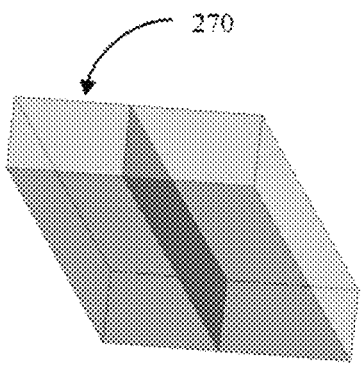

Referring now to FIGS. 2A-2D, configurations of the inlet section 110 are illustrated. For instance, FIG. 2A illustrates concentric circular inlet section 210, FIG. 2B illustrates eccentric circular inlet section 230, FIG. 2C illustrates rectangular concentric annular inlet section 250, and FIG. 2D illustrates rectangular side by side inlet section 270.

As illustrated in FIG. 2A, the inlet section 210 includes concentric tubes such as inner tune 210a and outer tube 210b. As illustrated the tubes 210a, 21b are coaxially configured for allowing the flow of different fluids therethrough. Herein, it will be noted that though the available heat transfer area is same for concentric circular tubes configuration 210 and eccentric circular tubes configuration 230 of the inlet section, in the eccentric configuration tubes configuration 230, the flow is highly non-uniform due the increased turbulence activity because of the constriction of flow near one side. This augments the heat transfer coefficient between the fluids. For the circular annular configurations 210 and the rectangular annular configuration 250, the placement of fluids can be distributed at any place within the tubes.

It will be understood that the disclosed apparatus may allow an introduction of a plurality of fluid for enabling mixing and solvothermal reaction therebetween to produce nanoparticles. Accordingly, the inlet section 210 may be configured to include a plurality of inlets (equal to the number of plurality of fluids) so as to accommodate separate introduction of the plurality of fluids into the apparatus. For example, the concentric circular inlet section 210 may include a plurality of concentric tubes coaxially configured for introducing the plurality of fluids into the apparatus. Similarly, the eccentric circular inlet section 230 may include a plurality of eccentrically placed circular tubes for introduction of the plurality of fluids. Also, the rectangular concentric annular inlet section 250 may include a plurality of rectangular inlet tubes for separately introducing the plurality of fluids into the apparatus 100. Moreover, the rectangular side by side inlet section 270 may include a plurality of splitters/separators for enabling introduction of the plurality of fluids separately into the apparatus 100.

It will also be understood that in various embodiments, the inlet section configuration may be selected from the available configurations based on various factors such as, reactant flow rates, reactant properties, chemical kinetics of the reaction, operating conditions of the reactor, and so on.

In an embodiment, the inlet section 110 is coupled to the reactor section 120 by means of a first connector. An example of the reactor section 120 is described further in detail with reference to FIGS. 1, 3.

The purpose of the reactor section 120 is to allow raw material including the reactants to meet (or mix) and therefore obtain a better mass transport and heat transport between two reactants. As a result, the reactants undergo solvothermal reactions to form product molecules. These product molecules, as they pass through the reactors towards downstream, undergo particle growth mechanisms: nucleation, diffusional growth, coagulation, and Ostwald ripening. A slurry of nanoparticles forms the product. The particle size of the product depends on the interplay among the aforementioned particle growth steps. To obtain the near uniform product particle properties (namely, particle size, particle size distribution, particle shape and crystallinity), the mixing of the reactants needs to be as rapid as possible. Thus, the resulting chemical reaction, particle formation and growth become uniform—the particles experience the similar length and time scales for the growth. The reactor section 120 allows for the rapid production of nanoparticles through supercritical solvothermal synthesis. The reactor section 120 uses induced relative differences in centrifugal forces because of curved flow path design to create an enhanced environment for mixing of fluid streams of the reactants that have distinct densities between the metallic precursor solution and the supercritical water.

Figure 3:
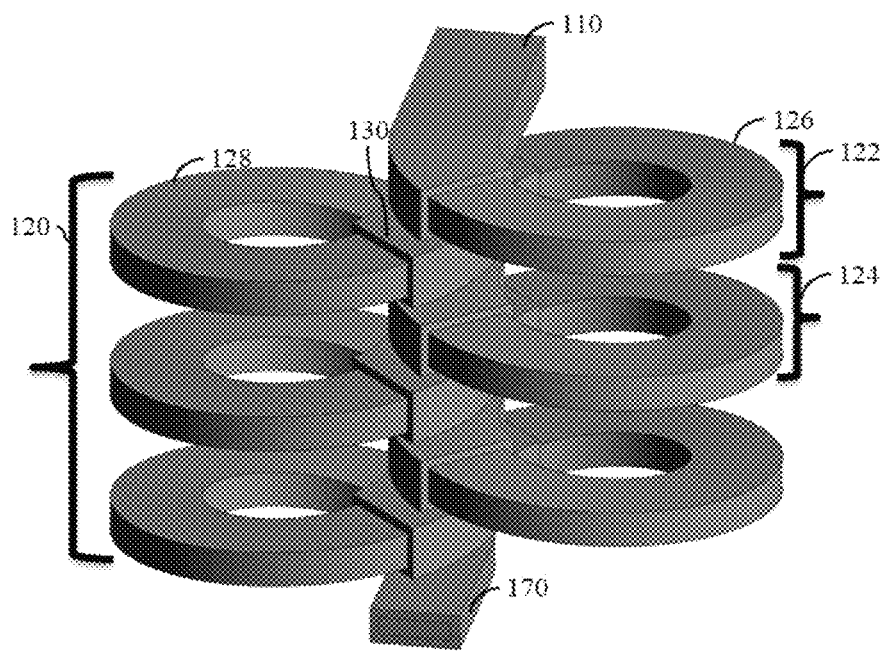
FIG. 3 illustrates an example reactor section of the apparatus of FIG. 1, in accordance with an example embodiment.

As illustrated in FIG. 3, the reactor section 120 extends from the inlet section 110 for enabling recurrent mixing and solvothermal reaction between the metallic precursor solution and the solvent. The solvothermal reaction leads to nanoparticles formation and nanoparticles growth. The reactor section 120 includes a spiral section having a plurality of spiral turns such that each spiral turn of the plurality of spiral turns includes a helical channel followed by a counter-helical channel. For example, the reactor section 120 is shown to include the plurality of spiral turns such as spiral turns 122, 124. Each of the spiral turns 122, 124 include a helical channel followed by a counter-helical channel. For example, the spiral turn 122 includes a helical channel 126 followed by a counter-helical channel 128. The counter-helical channel changes the direction of flow of the plurality of fluid phases (i.e. clock-wise to counter clock wise and vice-versa) upon flow of the plurality of fluid phases from the helical channel to the counter-helical channel. Herein, an important contribution of the disclosed embodiments is configuration of the spiral turns of the mixing section in the aforementioned manner, i.e. a helical turn followed by a counter-helical turn, thereby enabling enhanced mixing of the fluid phases.

The configuration of the spiral turn having the helical channel followed by a counter-helical channel gives an infinity shape to each of the plurality of spiral turns, as illustrated in FIG. 3. By virtue of the infinity shape of the turns, the metallic precursor solution and the solvent interchanges the flow direction thereby enabling mixing between the metallic precursor solution and the solvent. The chemical reactions between the metallic precursor solution and the solvent yields product molecules, which subsequently grow to ultrafine or nanoparticles as they pass through downstream of the reactor section 120.

In an embodiment, the reactor section 120 embodies a modular design, meaning thereby that the reactor section can be configured and/or dismantled by assembling and/or un-assembling, respectively multiple spiral turns. For example, the spiral turns such as spiral turns 122, 124 of the reactor section 110 can be assembled to form the reactor section. Also, each of the helical channels and counter-helical channels of the spiral turns can be assembled and un-assembled to configure and dismantle, respectively the corresponding spiral turn. For example, the helical channel 126 and the counter-helical channel 128 of the spiral turn 122 can be decoupled from each other to dismantle the spiral turn 122. Similarly, the helical channel 126 and the counter-helical channel 128 of the spiral turn 122 can be coupled to each other to configure the spiral turn 122.

In an embodiment, the assembling and/or un-assembling of the spiral turns and/or the reactor section 120 is facilitated by a plurality of connectors, as illustrated in FIGS. 4A-4E. Each of the plurality of connectors facilitates in coupling components of the reactor section 110. For example, a first connector 132 facilitates in coupling and decoupling the inlet section 110 and the reactor section 120. Also, a second connector 130 facilitates in coupling and decoupling the helical channel 126 and the counter-helical channel 128 of the reactor section 120. An example of the first connector is illustrated with reference to FIGS. 4A-4E.

Figures 4A, 4B:
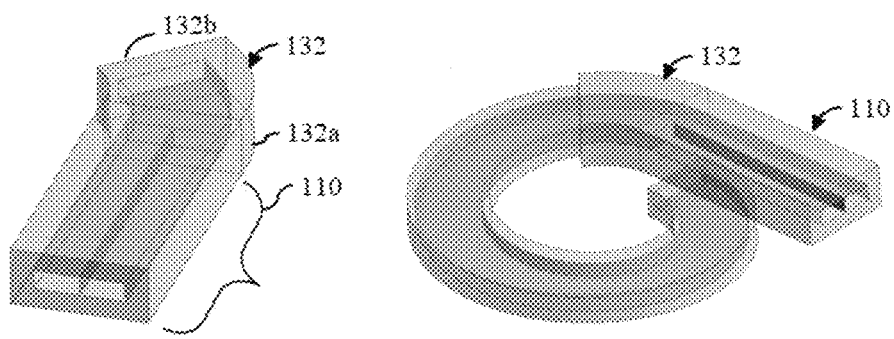
FIG. 4A illustrates an example first connector of the apparatus of FIG. 1, in accordance with an example embodiment.
FIG. 4B illustrates an example first connector of the apparatus of FIG. 1, in accordance with an example embodiment.

Referring to FIGS. 4A-4B, an example of a first connector 132 for coupling the inlet section 110 with the reactor section 120 is illustrated in accordance with an example embodiment. The first connector 132 includes a configuration having a first end portion 132a and a second end portion 132b. The first end portion 132a is configured to accommodate an edge portion of the inlet section, and the second end portion 132b is configured to accommodate an edge portion of the counter-helical channel, thereby coupling the inlet section with the helical channel of the reactor section.

Figure 4C:
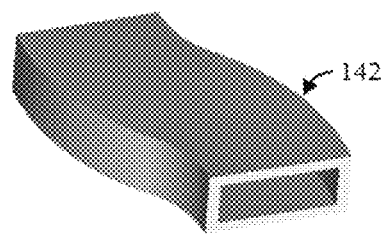
FIG. 4C illustrates an example second connector of the apparatus of FIG. 1, in accordance with an example embodiment.
Figure 4D:
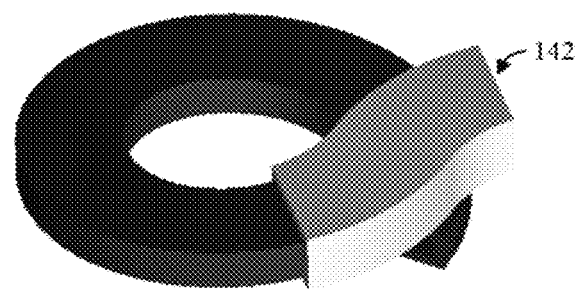
FIG. 4D illustrates an example second connector coupled to the helical channel of the apparatus of FIG. 1, in accordance with an example embodiment.
Figure 4E:
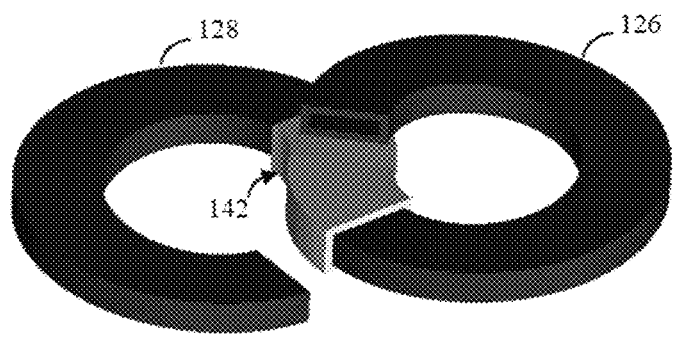
FIG. 4E illustrates an example second connector coupling a helical channel to a counter-helical channel of the apparatus of FIG. 1, in accordance with an example embodiment.

Referring to FIGS. 4C-4E, an example of a second connector 142 is illustrated. In an embodiment, the apparatus 100 includes a plurality of second connectors, wherein each second connector from amongst the plurality of second connectors is capable of coupling and decoupling a helical channel to a corresponding counter-helical channel to adjust the number of the plurality of spiral turns. For example, as illustrated in FIGS. 4C-4E the second connector 142 is capable of coupling and decoupling the helical channel to the corresponding counter-helical channel In an embodiment, the reactor section 120 includes a plurality of baffles configured within one or more of the helical channel and counter-helical channel of the first plurality of spiral turns for enhanced mixing of the precursor solution and the solvent. The baffles increase the contact area between the precursor solution and the solvent. In an embodiment, the number of baffles and/or the distance between the baffles depends upon the properties, such as density, viscosity of the reactants in contact. The configuration of the baffles in the spiral turns and/or counter-helical turns is described further in detail with reference to FIG. 5.

Figure 5:
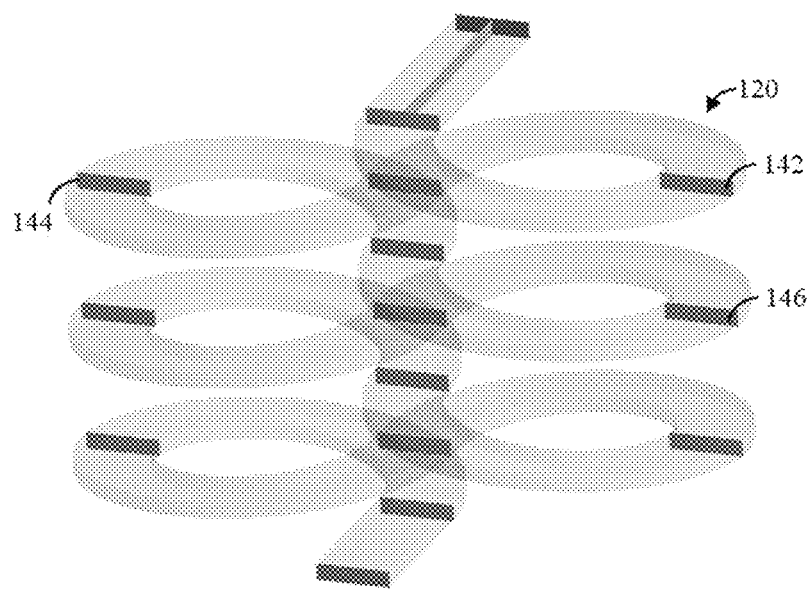
FIG. 5 illustrates example baffle arrangements embodied in the apparatus of FIG. 1, in accordance with an example embodiment.

Referring to FIG. 5, the reactor section 120 is shown to include a plurality of baffles 142, 144, 146 configured within the helical channel. Herein, for the sake of brevity of description, a single baffle is shown in each spiral turn. However, it will be understood that in alternate embodiments and implementations of the apparatus 100, each helical channel and the counter-helical channel may accommodate multiple number of/Nil baffles therein. In an example embodiment, the plurality of baffles may be configured near the core of the channel of the reactor 120. Additionally or alternatively, said baffles may be configured at an outer periphery wall and inner periphery wall of the helical/counter-helical channel. Herein, the baffles may be configured by affixing the said baffles at a top and bottom wall of said channel. Said baffles promote extensive mixing of the reactants.

Referring back to FIG. 1, the apparatus 100 includes the outlet section 170 configured at an end portion of the reactor section 120. The outlet section 170 facilitates in withdrawal of slurry of nanoparticles associated with targeted particle characteristics from the reactor 120. Herein, the targeted particle characteristics may refer to predefined mean particle size, standard deviation of the particle size distribution, particle shape, crystallinity. For example, for the application chemical mechanical planarization (CMP), mean size of nanoparticles should be typically between 10 to 20 nm with very narrow distribution (standard deviation of 1 to 2 nm), spherical in shape and 100% crystalline. Based on a coupled CFD-PBM simulations, the number of spiral turns required for production of the predefined or targeted nanoparticle characteristics can be estimated.

In an embodiment, the reactor section may be configured from the materials such as stainless steel 316 (SS316) and Hastelloy or any corrosion resistant materials. An example method for mixing and separating fluid phases is described further with reference to FIG. 8.

Upon obtaining the required particle growth of the nanoparticles, the particle systems in the reactor section are quickly brought to ambient temperature to arrest the further growth of nanoparticles. The apparatus 100 includes the quenching unit 150 having an external cooling mechanism for arresting the reaction and particle growth.

Figure 6A:
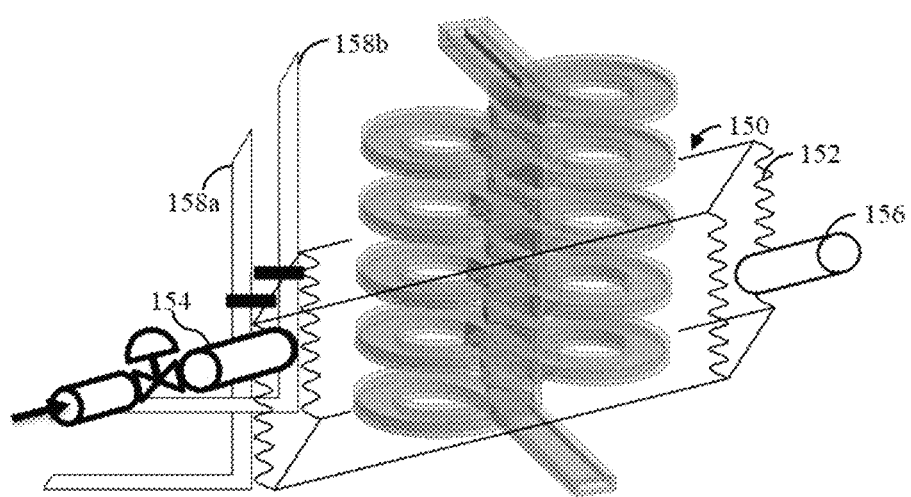

Referring collectively to FIG. 1, FIGS. 6A-6B, the flexible quenching unit 150 includes an enclosure 152, an inlet 154 and configured on an outer portion of the enclosure 152 for facilitating introduction of the quenching fluid to the enclosure, and an outlet 156 configured on the outer portion of the enclosure 152 for facilitating removal of the quenching fluid from the enclosure 152. The flexible enclosure is capable of adjustably enclosing (or covering) a set of spiral turns from amongst the plurality of spiral turns of the reactor section 120. The set of spiral turns are those turns that are configured towards an exit portion or a lower portion of the plurality of spiral turns. Herein, the term 'adjustably enclosing' the one or more spiral turns refers to a flexibility of the quenching unit to adjust the position thereof to target a required reactor region (or the set of spiral turns) for rapid cooling of the slurry. In an embodiment, the flexible quenching unit 150 embodies a mechanism for flexibly expanding and/or contracting the enclosure so as to adjustably enclose the one or more spiral turns. In an embodiment, the enclosure 152 may be configured of bellows for enabling expansion and/or contraction thereof. In an embodiment, the apparatus 100 may include a locking mechanism for holding the quenching unit with the set of spiral turns of the reactor section. In an example embodiment, the locking mechanism may include a support structure 158a, 158b for holding the quenching unit and a plurality of screws, such as screws 160a, 160b, mounted on the support structure for adjusting size of the enclosure.

The enclosure 152 is capable of holding a quenching fluid or a coolant for arresting the reaction. The quenching fluid may have a sub-zero temperature or normal room temperature which can drastically cool down the reaction mixture inside the reactor section to near room temperature to arrest the chemical reactions and particle growth. Examples of the coolant may include, but are not limited to, organic oils, polymer quenchants, gases (nitrogen or argon), and so on. Herein, since the particle size requirement varies depending on the application, the quenching unit may be adjustably located to the turns of the reactor section that needs to be cooled. A method for continuous solvothermal synthesis of nanoparticles is described further with reference to FIGS. 7, 8A and 8B.

Figure 8A:
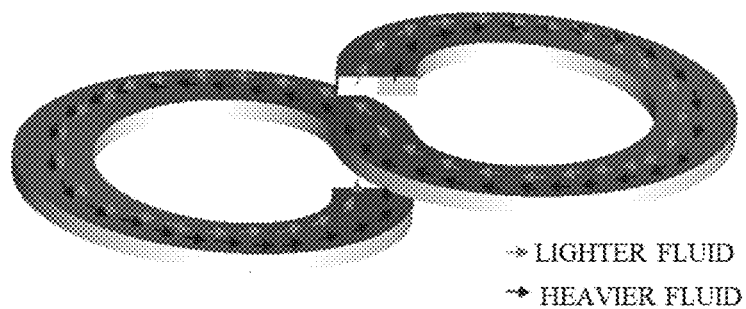
FIGS. 8A-8B illustrates a mechanism for flow of reactants in the reactor section of the disclosed apparatus of FIG. 1, in accordance with an example embodiment.
Figure 8B:
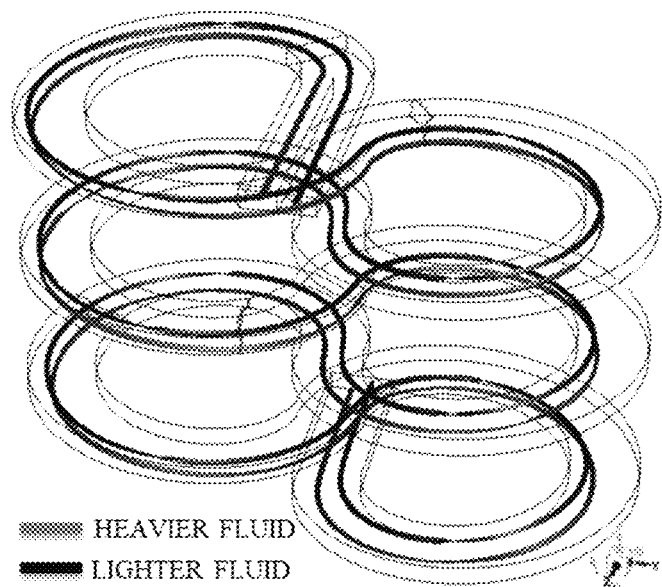

Referring collectively to FIGS. 7, 8A-8B, a method for continuous solvothermal synthesis of nanoparticles is illustrated, in accordance with an example embodiment. Particularly, FIG. 7 illustrates a flow diagram of a method 700 for continuous solvothermal synthesis of nanoparticles. FIGS. 8A-8B illustrates mechanism of flow of reactants in the reactor section of the disclosed apparatus 100 (refer FIG. 1).

Referring to FIG. 7, at 702, the method 700 includes introducing, in an apparatus, for example, the apparatus 100 of FIG. 1 for continuous supercritical solvothermal synthesis of nanoparticles, a mixture comprising a precursor solution and a solvent. The precursor solution may include metallic salt solution. Herein, the apparatus for solvothermal synthesis of nanoparticle may be the apparatus 100 described with reference to FIGS. 1-5. The aforementioned apparatus 100 and its components have been described in detail with reference to FIGS. 1-5, and hence for the brevity of description a detailed description thereof is precluded herein.

Referring now to FIGS. 8A-8B an example of flow of the solvent and the precursor fluid in a turn, for example, the turn 122 of the plurality of turns of the reactor section is illustrated. Herein, the solvent and the precursor fluid are the fluids of different densities. In particular, the precursor fluid is a metal salt solution and is heavier than the solvent. When two immiscible/miscible fluid streams, such as precursor solution and a solvent are allowed to pass through the channel (helical or counter-helical) spiral turns, for example the turn 122, the heavier fluid (such as the metal salt solution) tries to occupy the region near the outer periphery/wall of the channel because of the relative differences in the induced centrifugal forces acting on them. But once the heavier phase reaches the outer periphery, it shows very little motivation to mix with the lighter phase because of the forces acting in the environment. The disclosed apparatus 100, by changing the direction of the spiral turn, i.e., a counter turn which together forms a shape of an Infinity, allows altering the direction of said induced centrifugal forces, and thus the fluids further mix more intensely. In addition, this operation of reversing the direction of fluids is repeated by providing multiple turns in the apparatus, until a desired extent of mixing is attained.

In the apparatus 100, the plurality of spiral turns of the reactor allows mixing of the streams of the fluid gradually down the reactor section, which results in the solvothermal reactions of metallic salt solution to form metal oxide molecules.

Upon obtaining the required particle growth of the nanoparticles, at least a portion of the reactor section in the downstream is quickly brought to ambient temperature, by the quenching unit of the apparatus 100, to arrest the further growth of nanoparticles, at 704. At 706, the method 700 includes collecting the slurry quenched by the quenching unit. The slurry having the nanoparticles of targeted characteristics may be collected from the outlet section of the apparatus 100.

Example Scenario

The disclosed apparatus (for example the apparatus 100) was explored for the synthesis of nanoparticles to determine the effect of various process conditions and reactor configurations on mixing of the reactants, solvothermal reaction rates and their effect on final product particle size distribution (PSD). A multiphase coupled Computational Fluid Dynamics (CFD)-Population Balance Model (PBM) model based on the Eulerian-Eulerian approach is employed to simulate the flow, heat transport, reactions and particle population inside the disclosed apparatus. The model was employed in a commercial CFD software, ANSYS Fluent™ 16.0 and tested with published experimental data of ceria nanoparticle synthesis. The reactor configuration, wherein metallic precursor solution was introduced through an inner tube of the reactor section whereas supercritical fluid was introduced through the outer tube is utilized for nanoparticle synthesis. The mixing inside the reactor section is driven by centrifugal force due to the curvature of the spiral turn, which makes the heavier fluid (for example, the metal salt solution in this case) penetrating into the lighter fluid phase (i.e. the solvent) resulting in the efficient mixing followed by chemical reaction. The subsequent counter-helical turn extending from the helical turn causes the recurrent mixing phenomena enabling complete mixing of the reactants. As illustrated in the equations below, the molecules of the reactants forms into nanoparticles by undergoing nucleation, surface growth and coagulation mechanisms. Considering example of reactions involved in the solvothermal synthesis of ceria nanoparticles are:

Hydrolysis $$2Ce(NO3)_3 + 8H_2O \rightarrow 2Ce(OH)_4 + 6HNO_3 + H_2 \quad (1)$$

Condensation $$Ce(OH)_4 \rightarrow CeO_2 + 2H_2O \quad (2)$$

Because of the high process temperatures, the hydrolysis reaction is an instantaneous reaction and the overall reaction equation can be written as:

$$2Ce(NO_3)_3 + 4H_2O \rightarrow 2CeO_2 + 6HNO_3 + H_2 \quad (3)$$

In the aforementioned steps, the transport process of flow, heat and species transport play a significant role in the product formation. After the flow is stabilized, the nanoparticles of the targeted characteristics are formed.

For the purpose of example scenario, following simulation conditions were considered:

| Set | Flow Ratio (fr) M/S | Mettalic Salt Solution (M) | | Supercritical Water (S) | |
|---|---|---|---|---|---|
| | | Flow rate (g/min) | Velocity (m/s) | Flow rate (g/min) | Velocity (m/s) |
| Set 1 | 0.25 | 300 | 0.099 | 1200 | 1.859 |
| | 0.5 | 600 | 0.198 | | |
| | 0.75 | 900 | 0.298 | | |
| | 1 | 1200 | 0.397 | | |
| | 1.25 | 1500 | 0.496 | | |
| | 1.5 | 1800 | 0.595 | | |
| Set 2 | 0.25 | 600 | 0.1985 | 2400 | 3.7178 |
| | 0.5 | 1200 | 0.397 | | |
| | 0.75 | 1800 | 0.595 | | |
| | 1 | 2400 | 0.794 | | |
| | 1.25 | 3000 | 0.993 | | |
| | 1.5 | 3600 | 1.191 | | |
| Set 3 | 0.25 | 1200 | 0.397 | 4800 | 7.435 |
| | 0.5 | 2400 | 0.794 | | |
| | 0.75 | 3600 | 1.191 | | |
| | 1 | 4800 | 1.588 | | |
| | 1.25 | 6000 | 1.985 | | |
| | 1.5 | 7200 | 2.382 | | |

Using the CFD model, field such as velocity, temperature, and species fields of the reactants inside reactors were obtained for the simulated conditions, as illustrated with reference to the variations below (FIGS. 9-19). By giving said fields as inputs to PBM model, the product particle size distribution was obtained within the reactor section as a function of operating conditions.

For the aforementioned simulation conditions, the flow ratio started varying from 0.25 to 1.5 in increments of 0.25 keeping the flow rate of supercritical water constant and with increase in set the flowrate quantities doubles for given Flow ratio (FR). Overall the flowrates of Metallic salt solution (M) are varied from 300 g/min to 7200 g/min and Supercritical water(S) from 1200 to 4800 g/min to explore the limits on the nano particle synthesis. Based on the simulation studies, it was observed that flow ratio, FR (ratio of metallic precursor flowrate to supercritical flowrate) provides better insights into the mixing and chemical reactions inside the reactor section.

In an embodiment, where the inlet configuration is a rectangular side-by-side configuration (FIG. 2D), the presence of bisecting wall between the flow streams prevents the occurrence of chaotic mixing between the phases. To the tip of the bisecting wall ends into the reactor section where the phases begins to react with one another according to the stoichiometric equation to form the product i.e., ceria ($CeO_2$) nanoparticles.

Figure 9:
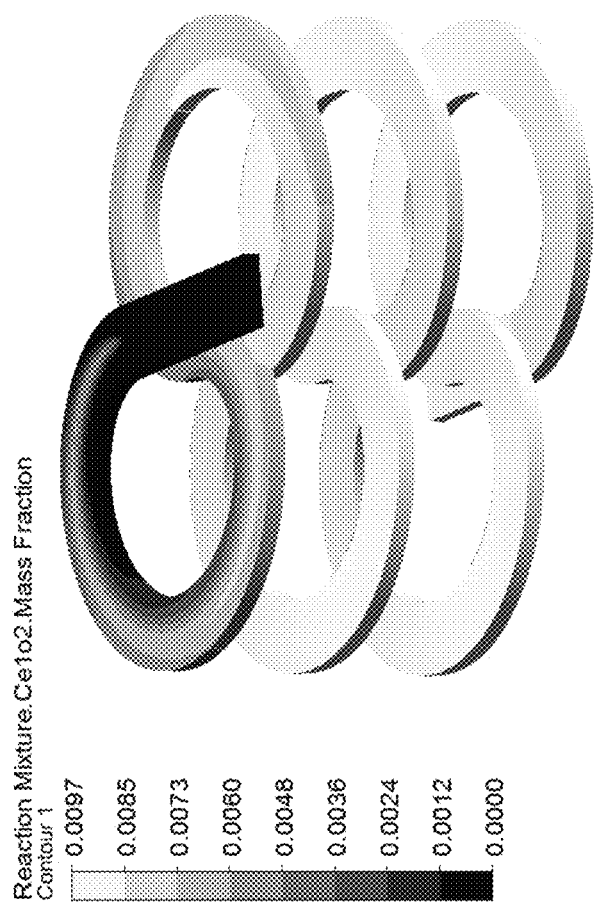
FIGS. 9-19 illustrates experimental results obtained using the apparatus of FIGS. 1-6B for continuous solvothermal synthesis of nanoparticles.

FIG. 9 depicts the contour plots of distribution of Ceria nanoparticles synthesis in the flow domain for various flow conditions of Set1. It is observed that the particle formation occurs when the two phases brought into contact with one another. For the values of low FR i.e., FR=0.25 and 0.5 there was a diffused band width of nanoparticles production because of the low flow rates of metallic salt solution and the completion of reaction occurs in the first few turns. With increase in FR value the flow rate of Metallic salt solution increases, and it is observed that the interface band turns from diffused to sharper. For higher values of FR the completion of reaction occurs in the deeper sections flow domain thereby taking the advantage of spiral-counter spiral combination. It is also observed that the maximum product formation occurs corresponding to flow conditions of FR=1. Further increase in the FR value (i.e., Metallic salt solution flow rate) does not contributes for the increase of Ceria particles production.

Figure 10:
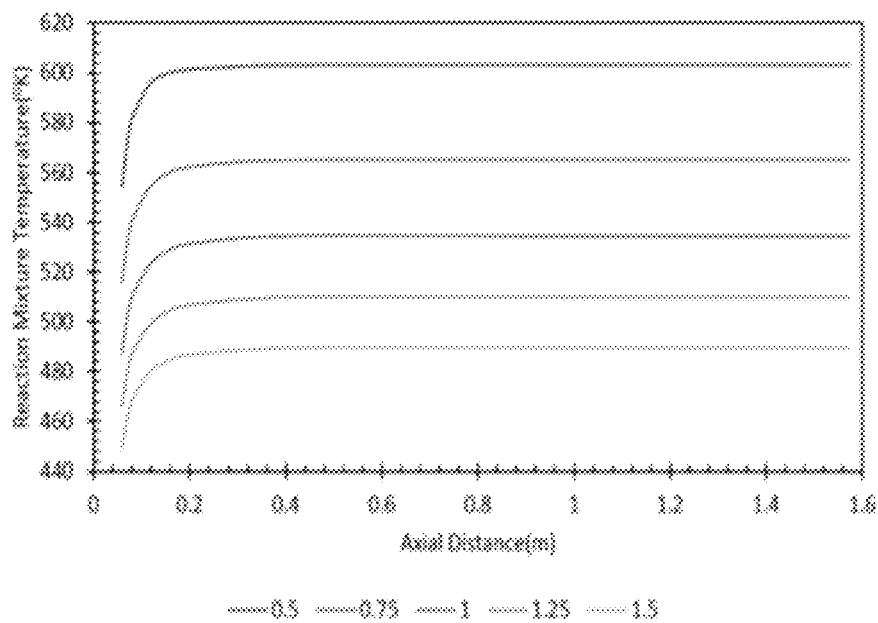

FIG. 10 depicts the contour plot of temperature distribution on the inner wall of the flow domain for different flow ratios under study respectively. At the steady state conditions, the temperature gradients had been developed both in axial and radial directions. For the inlet section the heat is being transferred from region close to the outer wall to the inner wall region, and these radial gradients gradually fade out with axial distance attaining a uniform temperature across the cross-section. It is observed that with increase in FlowRatio (FR) the reaction medium temperature is reduced.

Figure 11:
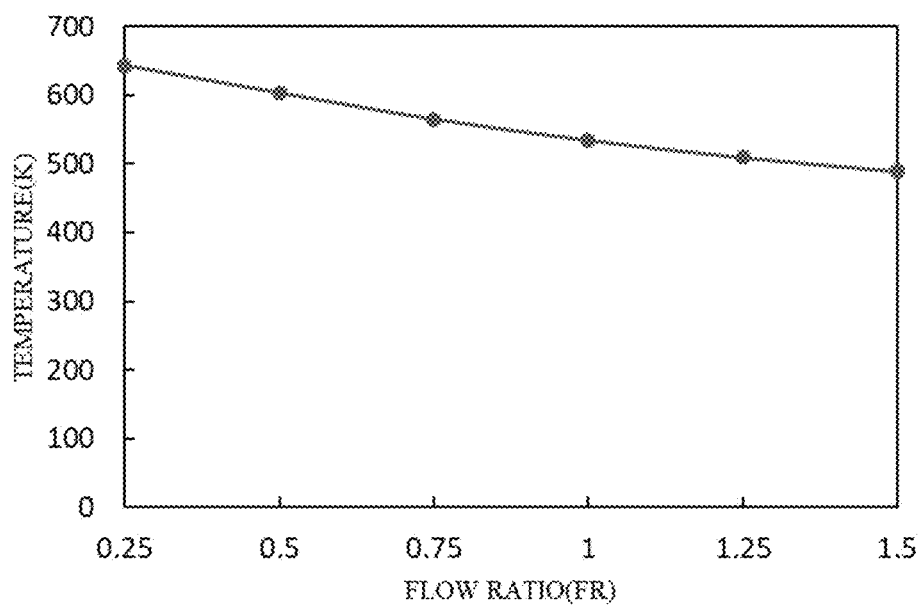
Figure 12A:
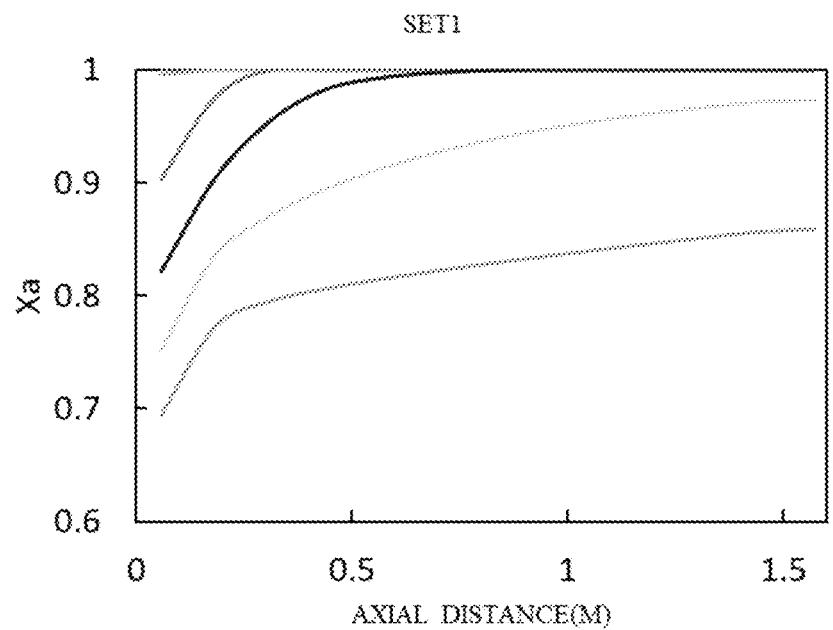
Figure 12B:
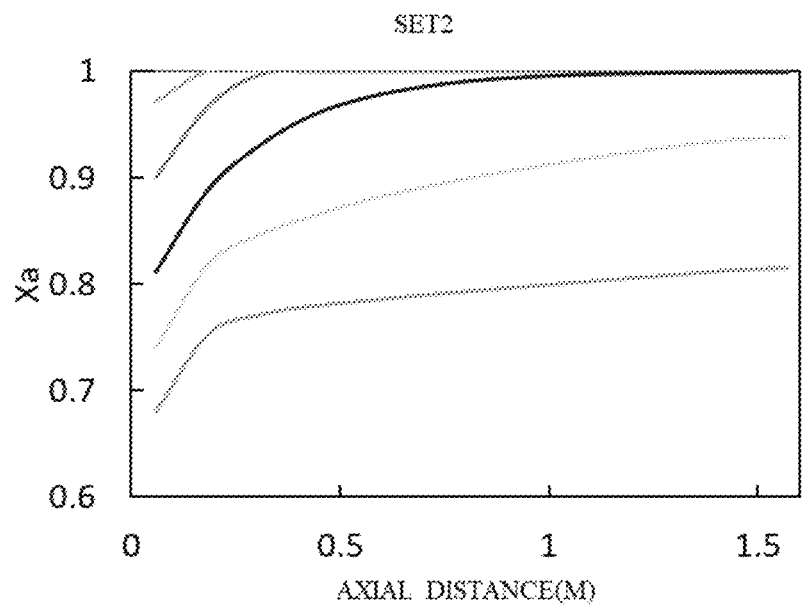
Figure 12C:
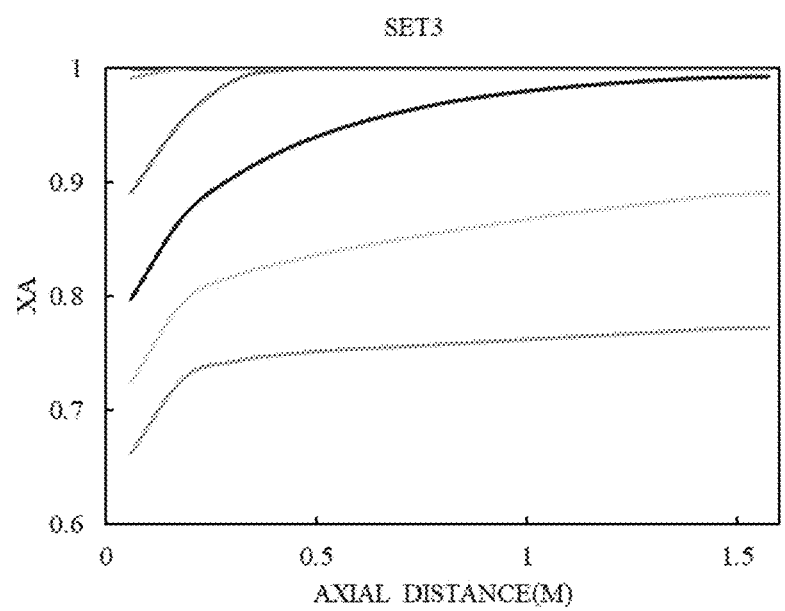

FIG. 11 shows the decrease in the averaged exit temperature measured at outlet for the various flow ratio conditions. It is to be noted that the exit temperatures are unchanged (i.e., negligible effect) with increasing the set because both the metallic salt solution and supercritical water flow rates have doubled respectively. Various cross-sectional planes are created along the flow path at the axial locations of 0.059, 0.185, 0.311, 0.437, 0.563, 0.69, 0.816, 0.942, 1.07, 1.19, 1.32, 1.44, and 1.57 m measured from the inlet section. At these locations the plane averaged quantities of conversion of reactant $$X_a = \frac{C_{Ao} - C_A}{C_{Ao}}$$

and yield of product ($C_R/C_{AO}$) for all the flow conditions are shown in the FIGS. 12A-12C and 13A-13C, respectively. It is observed from the FIG. 12A-12C for the lower flow ratios of FR=0.25 and 0.5, the reaction goes to completion instantaneously for all the sets. This is because the metallic salt solution is acting as the limiting reactant. For a given set the conversion initially increases with flow ratio up to FR=1 and starts decreasing with further increase in the FR values. This behavior is continual for the changing sets i.e, doubling the flow conditions. Yield in general expressed as the moles of the product (CR) formed for a mole of the reactant (CA0) consumed.

Figure 13A:
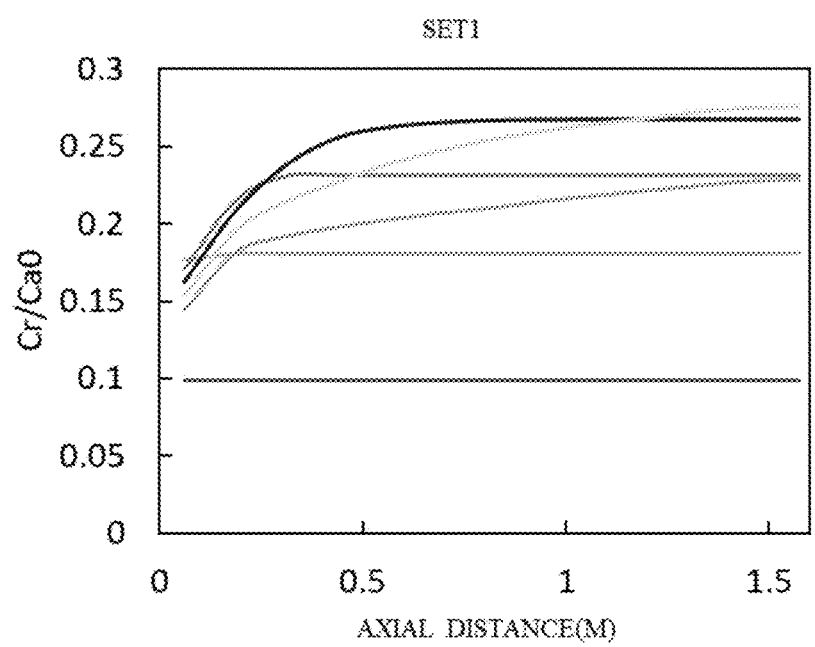
Figure 13B:
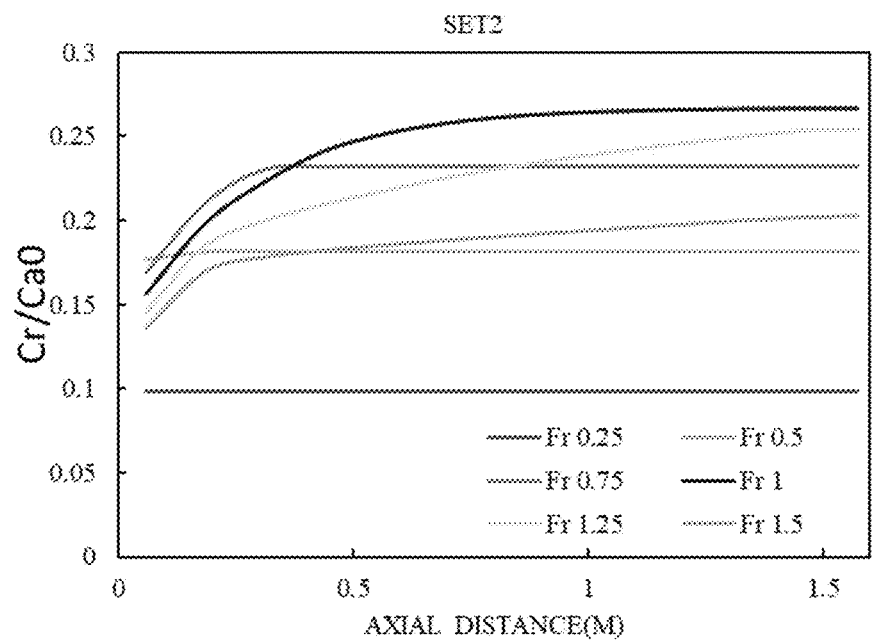
Figure 13C:
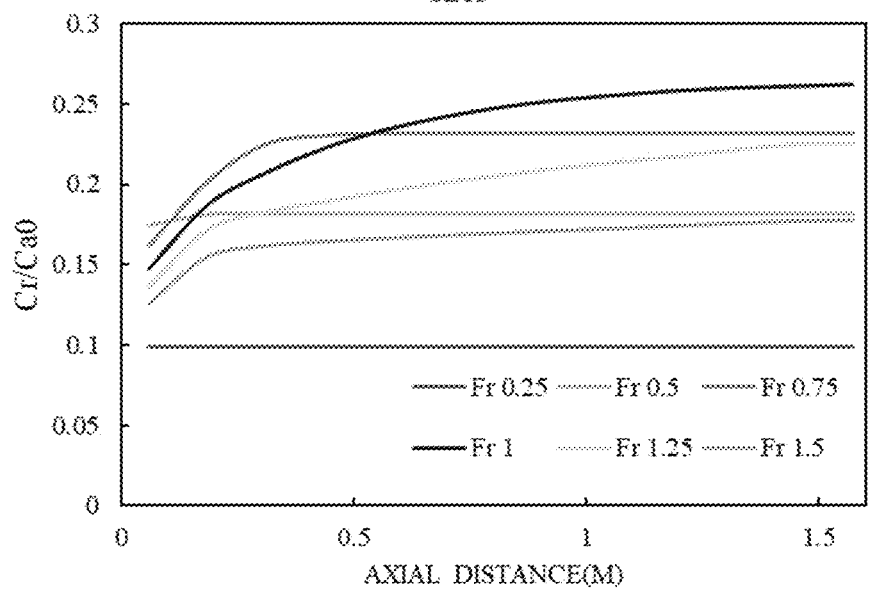

For a given set it is observed from the FIG. 13A-13C, the yield initially increases with flow ratio (FR) up to 1 and then shows a decreasing trend for higher values. The global behavior of the system does not get effected by the doubling the individual flow streams i.e, the set. But the extent of deviation (i.e., decrease) of yield obtained for the higher flow ratio's compared with FR=1 increases for higher sets. To comprehend these observations in a more vivid manner, the exit concentration's of synthesized Ceria (CeO2) nano particles for all the flow regimes under the study are shown in the bar graph FIG. 14, respectively. All the reported values are the flow-weighted average quantities measured at the outlet of the reactor.

Figure 14:
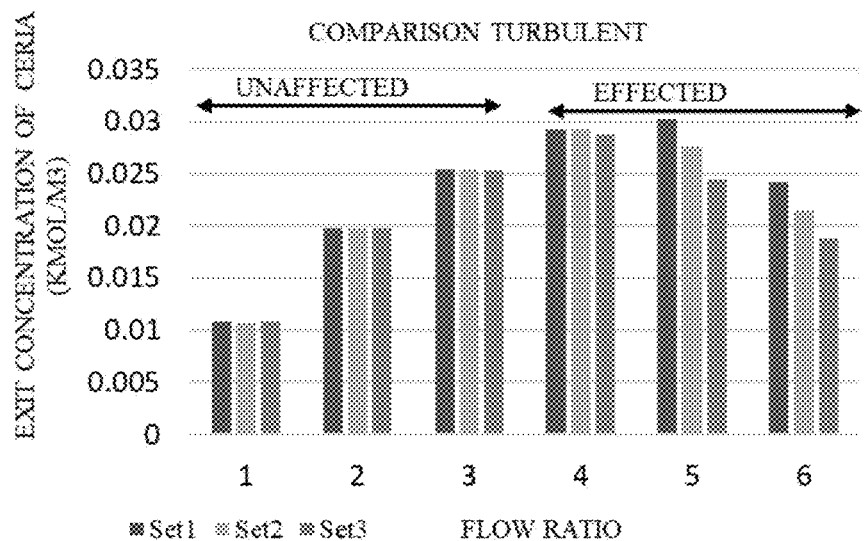

FIG. 14 illustrates an exit concentration of ceria at different flow rates. It can be observed from FIG. 14 that ceria concentration is unaffected for different flow rates for FR<1. However, it is more sensitive to flow rates when FR>1. The maximum ceria concentration is obtained at FR=1 for different flow rates of the reactants. Hence, the production rate of the ceria nanoparticles is independent of flow rates (up to 3400 ml/min) for FR=1, which facilitates the design and scale-up of the reactor for nanoparticle production.

For a given set, it is observed from the bar graph that the nanoparticle production increases with flow ratio up to FR=1 and then shows a decreasing trend. The exit concentration is also invariant for doubling individual reactant flow streams (i.e. Sets) up to FR=1 and then shows a significant reduction in production of nanoparticles for flow ratios of FR=1.25 and 1.5, respectively. It is observed from the FIG. 14, with average reaction mixture temperature decreases with increase in flow ratio (FR), as the flow rate of metallic salt solution is increasing for a constant supercritical water. But the available concentration of reactant increase with Flow ratio, hence there is a trade-off between the concentration and Temperature which in turn contribute to the rate of reaction as it is function of both.

It was evaluated that the product PSD at the exit of the reactor section for the best operating conditions (FR=1) to control and optimize the ceria nanoparticle characteristics. Thus, the disclosed apparatus facilitates in the design and scale-up of the apparatus 100 (FIG. 1) for large scale production of nanoparticles using the solvothermal method.

Herein it will be noted from FIG. 14, plot says with increase in FR (i.e., from Fr 0.75 to Fr 1.25) and Set number (i.e., from set1 to set2) the system behavior is evolving towards the Plug Flow behavior (PFR) which is ideal for nanoparticle growth as it eliminates the back mixing and dead zones. This behavior facilitates the finer monodispersed nanoparticle growth.

Figure 15:
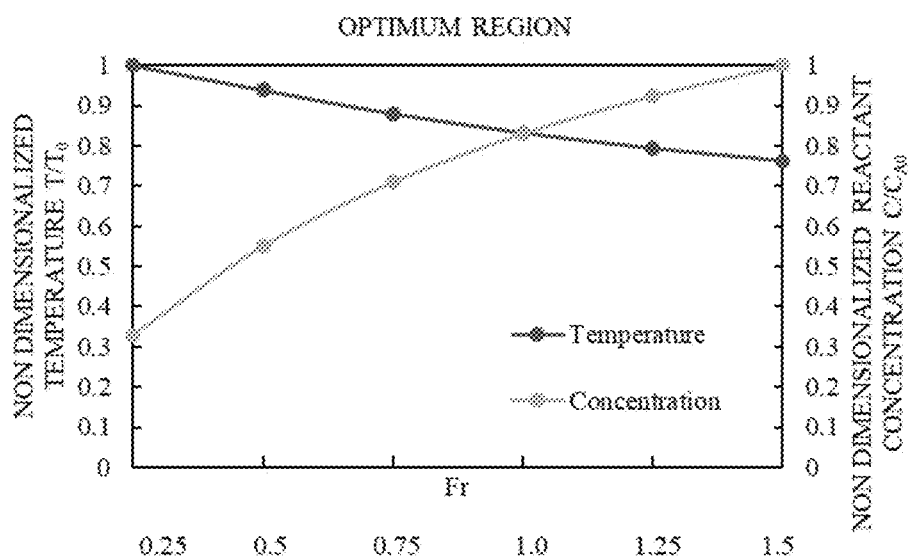

The FIG. 15 depicts the influence of flow ratio on the effective reaction mixture temperature and the incoming concentration of Metallic salt solution. These are normalized with respect to their highest values under the explored flow regimes i.e., the temperature is normalized w.r.t.T0 642K which belongs to the FR 0.25 and Metallic salt solution mole fraction of X0 0.00147 for FR 1.5. It is observed from the plot that with increase in the Flow ratio the effective reaction medium temperature decreases and the concentration of the metallic salt continue to increase. Interestingly, these two curves has crossed at the FR=1. As the rate of reaction is a function of both concentration and temperature. Though the concentration dependence term is increasing with FR it is being out weighed by the decreased temperature, hence optimum conditions are determined around FR=1. To understand the flow dynamics in a more detailed manner, a Residence Time Distribution Analysis was conducted, as described in the description below. Here two flow ratio regimes were selected, one below FR=1 and one above FR=1 and a tracer analysis was performed.

In reality, the reactors always deviate from ideal flow reactors i.e., Plug Flow Reactor (PFR) and Mixed Flow Reactors (MFR). This non-ideality is due to the presence of stagnant zones, recycling or back mixing fluid, or can be due the channeling of the fluid. In order to account for this non-ideality Residence Time Distribution (RTD) analysis is performed on the reactors by performing tracer analysis. A tracer fluid having the properties of super critical fluid and metallic salt solution are released from their corresponding inlet positions. At various locations the averaged vertex based concentrations of these fluids are measured with time, which is known in the literature as F curve. This data is converted into Exit-age (E) distribution of fluid by differentiating the F curve. Further, the E curve is converted in to Eθ curve by multiplying with mean residence time t. The complete data on the tracer analysis for all the conducted flow regimes is reported in the Table 2 (RTD analysis), respectively. The mean residence time and variance of the curve are determined as follows:

$$\text{Mean Residence Time } \bar{t} = \frac{\sum t_i C_i \delta t_i}{\sum C_i \delta t_i}$$

$$\text{Variance } \sigma^2 = \frac{\sum t_i^2 C_i \delta t_i}{\sum C_i \delta t_i} - \bar{t}^2$$

Variance represents the square of the spread of the distribution as it passes through the reactor, where Ci represents the concentration at the location for the time interval δti. It is observed from the Table 2 that the mean residence time decreases with increase in FR value as well with doubling the flow rates of metallic precursor and the super critical fluid (i.e Set).

TABLE 2

RTD Analysis

| Item | Flow ratio (FR) | Set 1 | 2 | 3 |
| --- | --- | --- | --- | --- |
| Average reaction mixture velocity u(m/s) | 0.75 | 0.647 | 1.294 | 2.586 |
| | 1.25 | 0.824 | 1.576 | 2.987 |
| Mean Residence Time | 0.75 | 2.772 | 1.416 | 0.45 |
| | 1.25 | 2.264 | 1.167 | 0.613 |
| Dispersion Number | 0.75 | 0.0339 | 0.01126 | 0.00458 |
| | 1.25 | 0.018621 | 0.007494 | 0.003515 |
| Dispersion Coefficient D | 0.75 | 0.02211 | 0.00423 | 0.001099 |
| | 1.25 | 0.009 | 0.00229 | 0.000738 |
| Spread | 0.75 | 0.52 | 0.04516 | 0.001856 |
| | 1.25 | 0.19 | 0.020411 | 0.002642 |

Figure 16A:
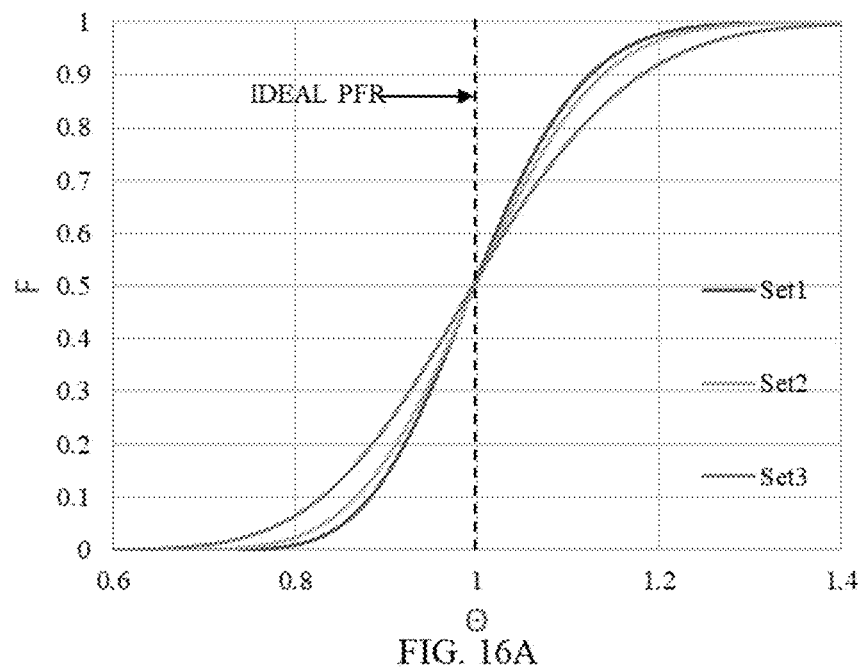
Figure 16B:
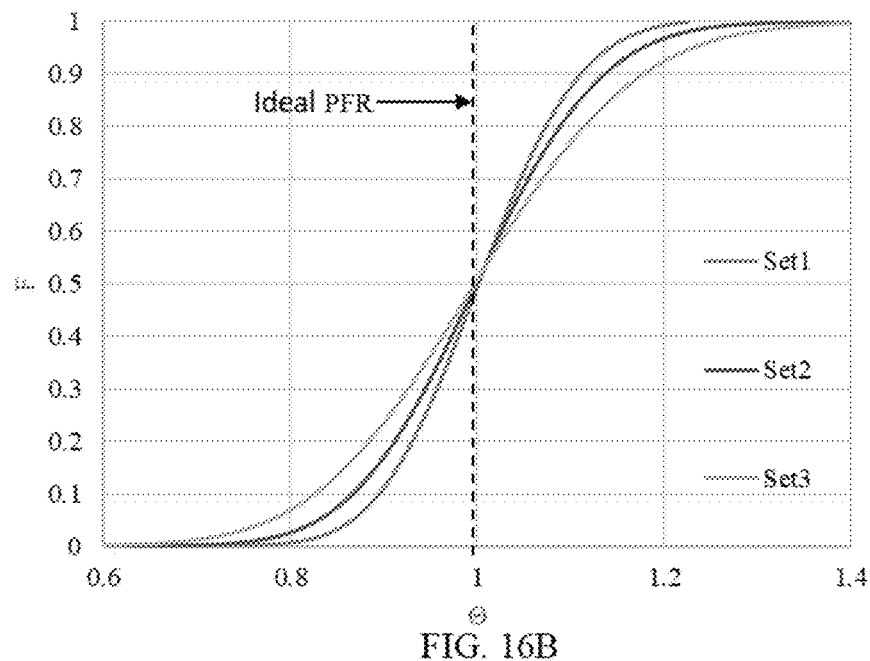

FIG. 16A-16B shows the variation of F (a measure of non-ideality) with θ (non-dimensionalized time with respect to t) for all the flow conditions studied while maintaining the Flow ratio to be 0.75 and 1.25, where the ideal PFR behavior is indicated with the dotted line at θ=1. For a given Flow Ratio (FR) FR=0.75, it can be seen that with increase in flow rates the reactors behavior deviates from PFR like to approaching towards the Mixed Flow reactor (MFR) conditions. Though these trends are maintained for the increased flow ratios condition i.e, FR=1.25, the degree of effect of Flow ratio is not coming out well. To show these changes better, $E_θ$ vs θ is analyzed which is shown in FIG. 16A-16B, respectively.

Figure 17:
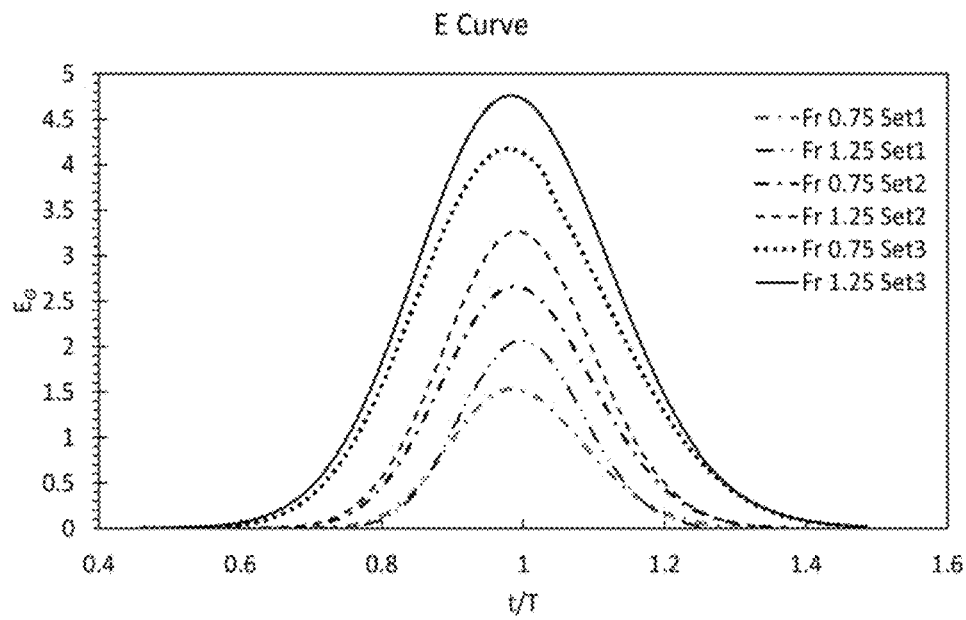

The FIG. 17 depicts the variation of normalized Exit age $E_\theta$ with $\theta$ for various sets of flow rates having the Flow Ratio (FR)'s of 0.75 and 1.25. The overall trends of these curves are almost symmetrical in shape, indicates the plug flow like behavior.

Dispersion model was chosen to fit to study the degree of deviation from ideal plug flow conditions, as this model is best suited for turbulent flow in pipes. In this model the longitudinal or axial dispersion coefficient D (m2/s) or vessel dispersion number D/μL are used as a measure to quantify the degree of spreading in the reactor. The values of Dispersion coefficient $$\frac{D}{\mu L} \to 0$$

means no spreading or insignificant dispersion, hence plug flow life behavior.

$$\frac{D}{\mu L} \to \infty$$

means rapid spreading or significant dispersion, hence mixed flow like behavior

Figure 18:
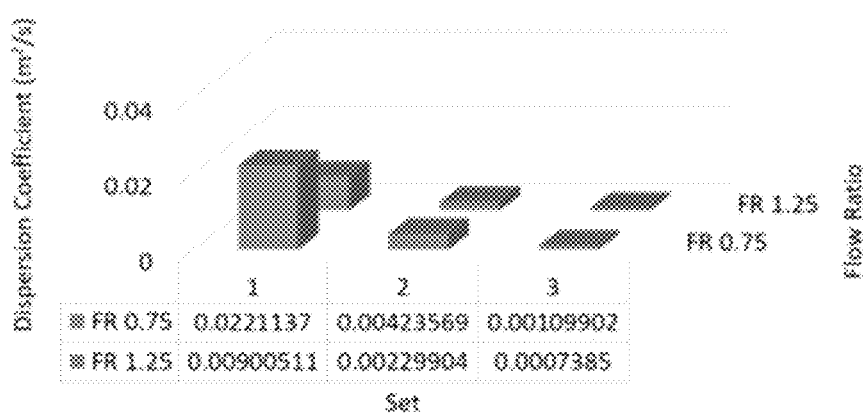

FIG. 18 depicts the effect of Dispersion coefficient with the different flow regimes considered. It is observed that for FR 0.75 Set1 the value of Dispersion coefficient D is 0.02211 and this value has stooped to a value of 0.00073 for the flow conditions Set3 of FR 1.25, where there is a 30 fold decrease in its value. This explains that with increase in flow rate the Infinity reactor is approaching towards the PFR like conditions. This observation is also supported by the values of the Spread ($\sigma 2$) which are reported in the Table2, respectively.

Figure 19:
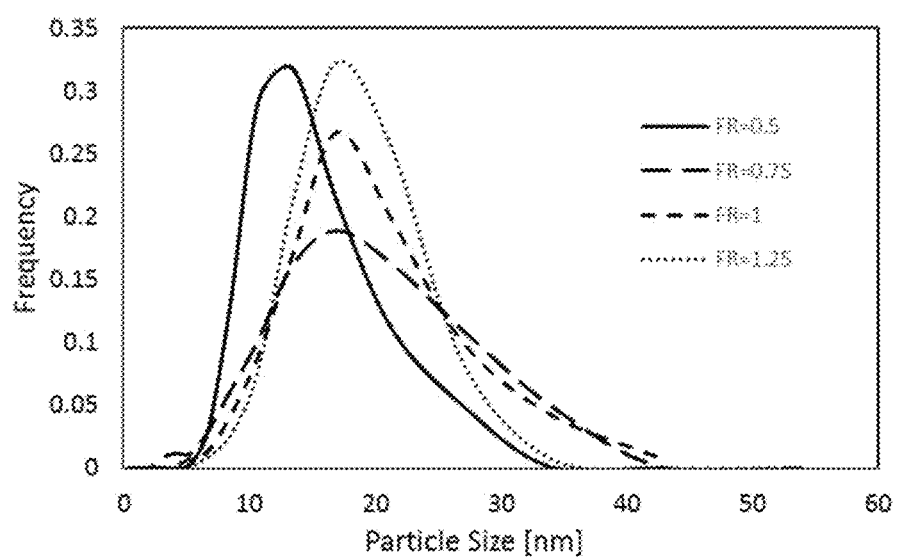

FIG. 19 depicts the effect of FR on the final product particle size distribution (PSD) of ceria nanoparticles. As FR increases, the PSD becomes broader and mean particle size also increases. However, the mode of ceria nanoparticles (the size corresponds to the peak of the distribution) is invariant for FR>0.5.

Various embodiments provide apparatus and method for continuous solvothermal synthesis of nanoparticles. The disclosed apparatus includes a reactor section having multiple turns in shape of infinity. By virtue of its shape, the reactor section is capable of provide a good mixing of reactants leading to production of nanoparticles of uniform size. Additionally, the disclosed apparatus includes a flexible quenching unit that can be adjusted to accommodate a number of turns (or a portion of the reactor) as per the requirement of the nanoparticle characteristics.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An apparatus for continuous solvothermal synthesis of nanoparticles, comprising:

an inlet section comprising a plurality of inlet portions for separately receiving at least a metallic precursor solution and a solvent;

a reactor section extending from the inlet section, the reactor section enabling continuous mixing resulting in solvothermal reactions between the metallic precursor solution and the solvent, and further nanoparticles formation and nanoparticles growth, the reactor section comprising a spiral section having a plurality of spiral turns, each spiral turn of the plurality of spiral turns having a helical channel followed by a counter-helical channel, wherein the metallic precursor solution and the supercritical fluid interchanges the flow direction for enabling mixing between the metallic precursor solution and the solvent, and wherein the solvothermal reactions between the metallic precursor solution and the solvent yields a slurry comprising nanoparticles;

a flexible quenching unit enclosing a set of spiral turns from amongst the plurality of spiral turns, the set of spiral turns configured in proximity to an exit portion of the reactor section, the flexible quenching unit capable of holding a quenching fluid for rapidly reducing temperature of the reactor section to a set temperature, further wherein the flexible quenching unit capable of adjusting a number of the set of spiral turns based on targeted particle characteristics of the nanoparticles; and an outlet section configured at an exit portion of the reactor section for collecting the slurry of nanoparticles.

2. The apparatus of claim 1, wherein the solvent comprises one of an organic solvent, an inorganic solvent, and a supercritical fluid.

3. The apparatus of claim 1, wherein the mixing section comprises a plurality of baffles configured within at least one of a helical channel of the plurality of helical channels and a counter-helical channel of the plurality of counter-helical channels for enhanced mixing of the metallic precursor solution and the solvent.

4. The apparatus of claim 1, further comprising a first connector for coupling the inlet section with the reactor section.

5. The apparatus of claim 1, wherein a number of the plurality of spiral turns is adjusted based on the targeted nanoparticle characteristics.

6. The apparatus of claim 4, further comprising a plurality of second connectors, wherein each second connector from amongst the plurality of second connectors is capable of coupling and decoupling a helical channel to a corresponding counter-helical channel to adjust the number of the plurality of spiral turns.

7. The apparatus of claim 1, wherein the flexible quenching unit comprises:
- an enclosure around the set of spiral turns for holding the quenching fluid capable of reducing temperature of the reactor section to the set temperature;
- an inlet configured on an outer portion of the enclosure for facilitating introduction of the quenching fluid to the enclosure; and
- an outlet configured on the outer portion of the enclosure for facilitating removal of the quenching fluid from the enclosure.

8. The apparatus of claim 7, further comprising a locking mechanism for holding the quenching unit with the set of spiral turns of the reactor section, the locking mechanism comprising a support structure for holding the quenching unit, and a plurality of screws mounted on the support structure for adjusting size of the enclosure.

9. A method for continuous solvothermal synthesis of nanoparticles, the method comprising:
- introducing, in an apparatus for continuous solvothermal synthesis of nanoparticles, a metallic precursor solution and a solvent, the apparatus comprising:
  - an inlet section comprising a plurality of inlet portions for separately receiving at least the metallic precursor solution and the solvent;
  - a reactor section extending from the inlet section, the reactor section enabling continuous mixing resulting in solvothermal reactions between the metallic precursor solution and the solvent, and further nanoparticles formation and nanoparticles growth, the reactor section comprising a spiral section having a plurality of spiral turns, each spiral turn of the plurality of spiral turns having a helical channel followed by a counter-helical channel, wherein the metallic precursor solution and the supercritical fluid interchanges the flow direction for enabling mixing between the metallic precursor solution and the solvent, and wherein the solvothermal reactions between the metallic precursor solution and the solvent yields a slurry comprising nanoparticles;
  - a flexible quenching unit enclosing a set of spiral turns from amongst the plurality of spiral turns, the set of spiral turns configured in proximity to an exit portion of the reactor section, the flexible quenching unit capable of holding a quenching fluid for rapidly reducing temperature of the reactor section to a set temperature, further wherein the flexible quenching unit capable of adjusting a number of the set of spiral turns based on targeted particle characteristics of the nanoparticles; and
  - an outlet section configured at an exit portion of the reactor section for collecting the slurry of nanoparticles;
- quenching the slurry, in the flexible quenching unit, to obtain the nanoparticles of targeted characteristics; and
  - collecting, at the outlet section, the slurry quenched in the quenching unit.

* * * * *